May 18, 1937.  W. F. CRAWFORD  2,080,764
VEHICLE BOW SUPPORT
Filed Nov. 5, 1936
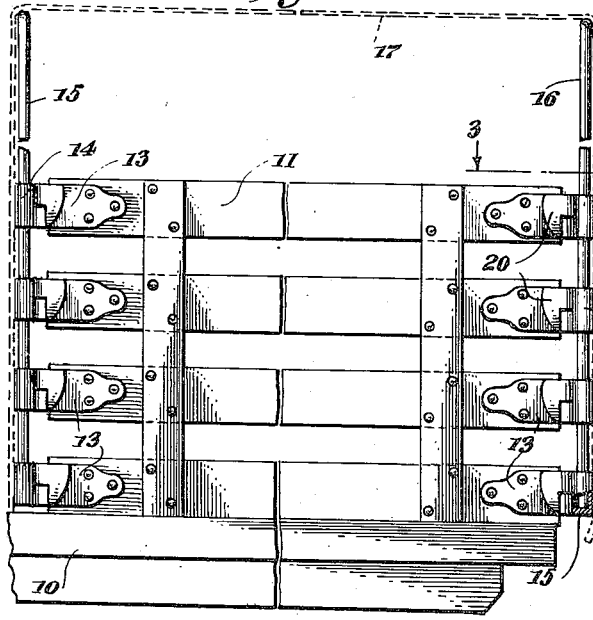
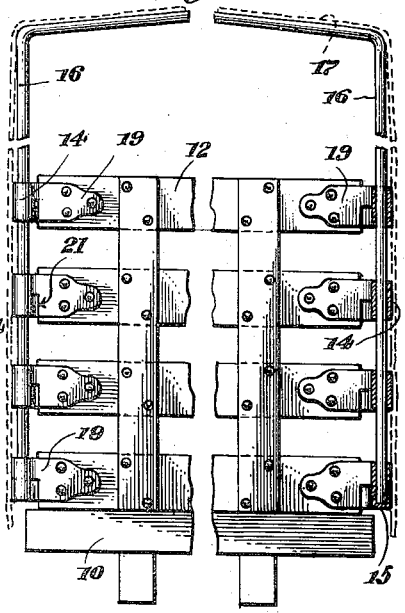
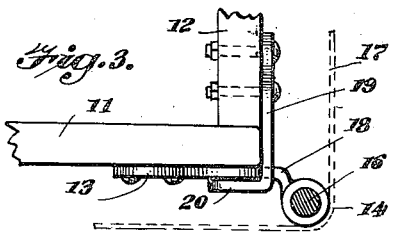
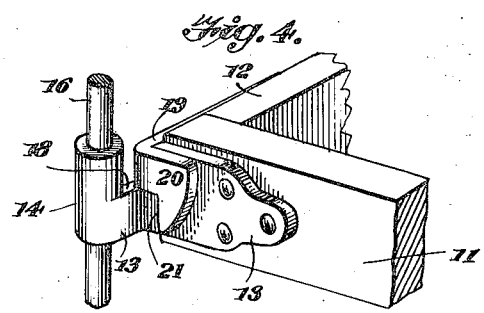
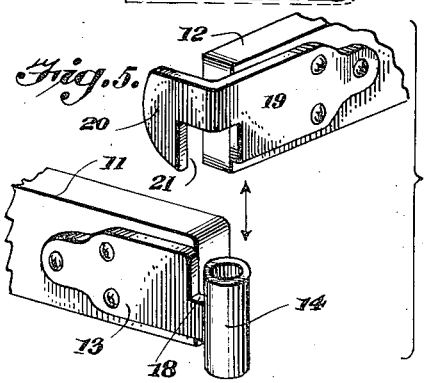
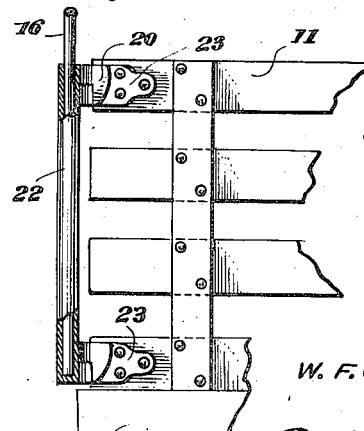
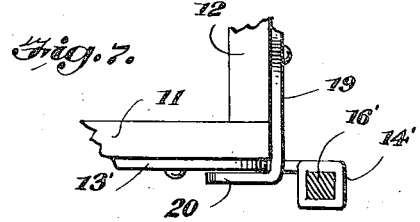
Inventor
W. F. CRAWFORD
By E. F. Salter
Attorney Patented May 18, 1937

2,080,764

UNITED STATES PATENT OFFICE 2,080,764

VEHICLE BOW SUPPORT

Wilbur F. Crawford, Waco, Tex.

Application November 5, 1936, Serial No. 109,365

2 Claims. (Cl. 296—10)

The present invention relates to improvements in supports or holders for the cover supporting bows of vehicles.

An important object of this invention is a provision of a bow holder which will support the vehicle bow at a point spaced beyond the body of the truck or vehicle.

Another object of the invention is the provision of a device of this character which supports the vehicle cover out of rubbing contact with the vehicle body, end gates and the vehicle load.

A further object of the invention is to provide a device of this character which combines a bow holder with a vehicle gate lock.

Other objects and advantages of the invention will be apparent during the course of the following description.

In the accompanying drawing which forms a part of this specification and wherein like characters of reference denote like parts throughout, Figure 1 is a side elevation of a vehicle body embodying the present invention, parts being broken away, Figure 2 is a rear elevation thereof, parts being broken away, Figure 3 is a detail fragmentary sectional view on the line 3—3 of Figure 1, Figure 4 is a detail perspective view of a portion of one corner of the vehicle body, showing the combined bow holder and gate lock in operative position, Figure 5 is a detail perspective view illustrating the parts of the gate lock in position for engagement with each other, Figure 6 is a fragmentary side elevation of a vehicle body embodying a modified form of the invention, and, Figure 7 is a view similar to Figure 3 illustrating a slightly modified form of the invention.

In the drawing, wherein for the purpose of illustration are shown several preferred embodiments of the invention, the numeral 10 designates the bed of a vehicle body, having side boards 11 and end gates 12 at the front and rear of the body. In order to facilitate loading and unloading of the vehicle body the gates 12 must be readily removable.

The side boards 11 of the vehicle body are provided at each of their ends with a vertically disposed series of metal brackets 13 bolted or otherwise secured to the side boards immediately adjacent the ends thereof. The brackets 13 extend a substantial distance beyond the ends of the side boards and are provided at their ends with socket members 14 which are vertically arranged and spaced from the ends of the side boards. The brackets 13 may be of any suitable number, four being shown at each end of the side boards for the purpose of illustration. The sockets 14 at each end of the side boards are disposed in vertical alignment, and the lower socket of each group or series is closed at its lower end, as indicated at 15 in Figure 1.

A substantially inverted U-shaped bow 16 is arranged at each end of the vehicle body and is removably received in the sockets 14 as indicated in the drawing. The legs of each bow 16 extend through the aligned sockets and rest upon the closed lower ends 15 of the lower sockets. The tarpaulin, canopy or cover 17 is supported by the bows 16 and intermediate bows may be used, if desired, and supported in any suitable manner. The portion of the bracket 13 between the ends of the side boards 11 and the sockets 14 may be offset as shown in Figures 3 and 4 so that the sockets will be offset laterally as well as longitudinally beyond the vehicle. It will be seen by reference to Figure 3 that this lateral and longitudinal offset of the sockets 14 results in the bows 16 supporting the canopy 17 in spaced relation to the sides and ends of the vehicle body and out of rubbing contact with the body and the load.

The portions of the brackets 13 between the ends of the vehicle body and the socket 14 are provided with deep notches 18 on their upper sides which may extend from the ends of the vehicle body to the sockets 14. Each of the end gates 12 is provided at its ends with brackets 19 disposed in horizontal alignment with brackets 13, and bolted or otherwise rigidly secured to the end gates 12. The brackets 19 extend out a substantial distance beyond the ends of the gates and are bent over at right angles to form latches 20 disposed parallel to the ends of the gates and spaced therefrom a distance slightly in excess of the combined thickness of the side boards 11 and brackets 13. The brackets 19 are deeply notched on their lower sides adjacent latches 20, as indicated at 21 and preferably correspond in number to the brackets 13, although they may obviously be of a less number if desired. In operative position the end gates 12 are arranged between the ends of the side boards 11, and the notched latches 20 fit over the notched brackets 13 to removably secure the gates in position. The interfitting notches 18 and 21 and latches 20 prevent removal of the gates 12 in any direction but vertically upward.

The combined latch lock brackets 13 and sockets 14 support the bows 16 in offset position with respect to the body of the vehicle and at the same time serve to support and latch the gates 12 in a manner to permit removal of the gates without interference from the bows 16 or the canopy 17. Not only is the canopy supported out of rubbing contact with the vehicle body and load, but it is out of contact with the gates and their latches 20. Consequently the canopy and gates are not only supported in an inexpensive and efficient manner but the life of the canopy is materially lengthened.

In place of the offsetting of the end of the bracket 13 as indicated in Figure 3, the same effect can be produced by offsetting the socket with respect to the bracket as illustrated in Figure 7. The bracket 13' may be straight as shown, and the socket 14' offset with respect thereto as indicated to support the bow 16' in position to space the canopy from the sides of the vehicle body. The bore of the sockets and the legs of the bows may be of any configuration, being shown as circular in cross-section in Figures 3, 4 and 5, and rectangular in Figure 7.

In place of a plurality of individual brackets and sockets, each corner of the vehicle body may be provided with a single elongated socket 22 closed at its lower end and supported at top and bottom by brackets 23 similar or identical with brackets 13, as illustrated in Figure 6. With this form of the invention, each gate need only be supplied with two latches 20 at each end to engage the notched brackets 23.

While I have shown and described the preferred embodiments of my invention it is to be understood that various changes in the size, shape and arrangement of parts may be resorted to without departing from the spirit of my invention or the scope of the subjoined claims.

Having thus described my invention, what I claim and desire to protect by Letters Patent is:

1. In combination with a vehicle body having wall members, a combined bow holding and latching means for detachably connecting said wall members, said means comprising brackets on said wall members provided with interlocking latch elements, one of said latch elements projecting beyond the vehicle body and provided with a socket adapted to receive a bow to support a cover in spaced relation to said vehicle body and out of rubbing contact therewith.

2. A combined vehicle gate latch part and bow holder comprising a bracket having an attaching portion to be secured to an upright wall of a vehicle body and a portion extending beyond the vehicle body and formed with a bow receiving socket member, said bracket being provided between the attaching portion and the socket member with a notch opening out through one edge thereof and adapted to receive a cooperating gate latch part, one side of said notch being formed by the adjacent wall of said socket member.

WILBUR F. CRAWFORD.